United States Patent [19]

Youngberg

[11] Patent Number: 5,119,341
[45] Date of Patent: Jun. 2, 1992

[54] METHOD FOR EXTENDING GPS TO UNDERWATER APPLICATIONS

[75] Inventor: James W. Youngberg, Rome, N.Y.

[73] Assignee: The United States of America as represented by the Secretary of the Air Force, Washington, D.C.

[21] Appl. No.: 731,559

[22] Filed: Jul. 17, 1991

[51] Int. Cl.⁵ ............................................. H04B 1/59
[52] U.S. Cl. ............................................. 367/5
[58] Field of Search ........................................ 367/2-6

[56] References Cited

U.S. PATENT DOCUMENTS

| | | | |
|---|---|---|---|
| 4,445,118 | 4/1984 | Taylor et al. | 343/357 |
| 4,622,557 | 11/1986 | Westerfield | 342/357 |
| 4,639,903 | 1/1987 | Redolfi | 367/131 |
| 4,691,305 | 9/1987 | Kuck | 367/5 |
| 4,751,512 | 6/1988 | Longaker | 342/357 |
| 4,894,662 | 1/1990 | Conselman | 342/357 |
| 4,924,448 | 5/1990 | Gaer | 367/88 |

Primary Examiner—Daniel T. Pihulic
Attorney, Agent, or Firm—William G. Auton; Donald J. Singer

[57] ABSTRACT

A system that extends the use of a navigation system which uses radio waves to a an environment which is otherwise inaccessible to radio-based position, location, or navigation services. This system provides beacons which dynamically determine their positions and broadcast data to any number of underwater users. By receiving and processing the beacon data or the signal upon which it is modulated, the user dynamically determines its own position within a geodetically-based time-space coordinate system. Extending externally-generated navigation information to an underwater user need not be limited to the Global Positioning System or its signal structure. Underwater extensions of LORAN, Omega, and other navigation services are also amenable to the technique.

22 Claims, 5 Drawing Sheets

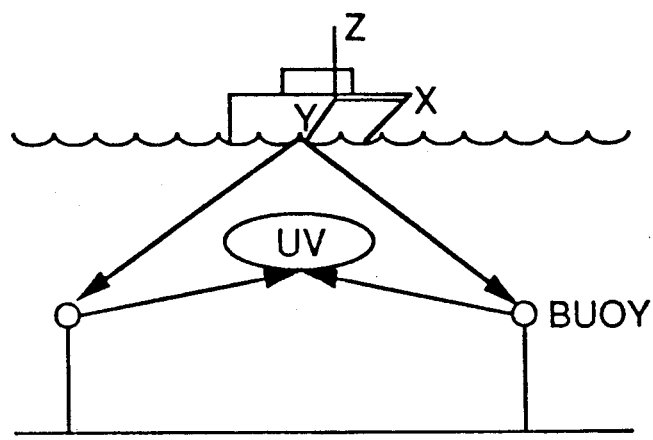
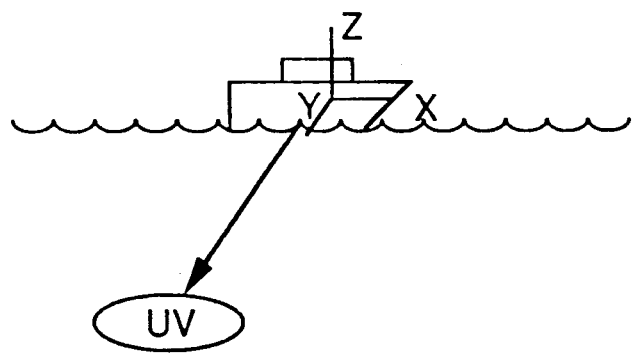
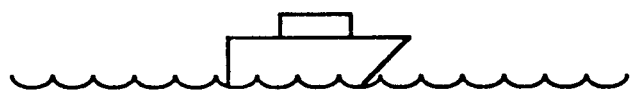
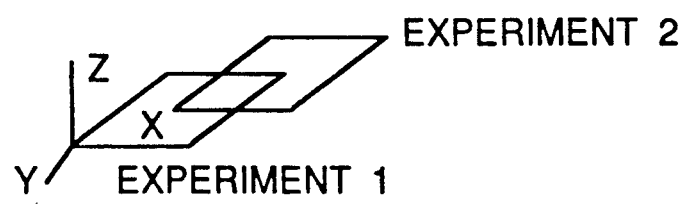
FIG. 4

METHOD FOR EXTENDING GPS TO UNDERWATER APPLICATIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to navigation systems, and more specifically the invention pertains to a means for underwater users to dynamically determine their position in a geodetically based coordinate system.

The need for accuracy, precision, and data registration in underwater positioning and navigation should be viewed as no less stringent than that existing on the surface or in the aerospace environment. The present invention includes a system which can be used to provide navigation service to free-ranging underwater users. Using this system an unlimited number of users can independently locate themselves and navigate. Underwater extensions of LORAN, OMEGA, or other radio-based navigation systems are also amenable to the technique.

The Global Positioning System and its antecedents cover the world's land and sea surfaces and the airspace volume, but currently do not support any of the sea volume. Covering some 71 percent of the earth, with an average depth of 3800 meters, the seas represent a volume of 1370 million cubic kilometers, presently inaccessible to conventional navigation services. Even if interest were limited to economic zones bounded by the continental shelf, five million new cubic kilometers of sea space could be made accessible with an appropriately-extended navigation service.

The marine technology community (e.g., people or groups conducting underwater scientific or defense research, or conducting commerce such as mapping or resource exploitation), uses various methods of underwater positioning and navigation. One determines the position of a surface support vehicle, deploys bottom-tethered beacons and relates their positions to that of the surface vehicle, then has users subsequently relate their position to those of the beacons. Another system determines the position of a surface support vehicle and subsequently relates the user's position to it in angle and range. A third relates data from one experiment to another based on the overlap of data and subsequently determined the relationship of some element or elements of this data to know positions.

It is noteworthy that, rather than locating itself under these scenarios, the user is most often "found" by the support vehicle Alternately, it "locates" itself relative to fixed, local monuments. Truly free-ranging users typically rely on inertial navigation systems, calibrated at the start of their mission. In any event, none of these users can make a direct determination of his dynamic position tied directly to a common, fixed, geodetically-based time-space coordinate system.

The Navstar Global Positioning System (GPS) is a space-based navigation system designed to allow an unlimited number of users to passively receive precise position, velocity, and time information anywhere on or above the earth's surface. Once the entire satellite constellation is in orbit, GPS will provide accurate, continuous positioning service for military and civilian ships, boats, aircraft, and land vehicles. GPS is expected to become a primary navigation aid during the 1990s.

Articles in the professional literature describing the proposed or actual application of the Global Positioning System and other radio-based navigation services to user vehicles concentrate on the sea surface, terrestrial, and aerospace environments. Vehicles in these environments may use GPS as primary means of dynamic position determination or may use GPS to calibrate an inertial navigation system (INS). Underwater GPS users must rely on their inertial navigation system for primary dynamic position determination and must surface to access the GPS signal and calibrate their INS. Furthermore, none of the current methods of underwater positioning and navigation provide for direct determination of the user's dynamic position in a global reference system.

The task of extending the use of the Global Positioning System into a passive underwater navigation system is alleviated, to some extent, by the systems described in the following U.S. Pat. Nos., the disclosures of which are specifically incorporated by reference:

U.S. Pat. No. 4,924,448 issued to Gaer;
U.S. Pat. No. 4,894,662 issued to Counselman;
U.S. Pat. No. 4,751,512 issued to Longaker;
U.S. Pat. No. 4,639,903 issued to Redolfi;
U.S. Pat. No. 4,622,557 issued to Westerfield; and
U.S. Pat. No. 4,445,118 issued to Taylor et al.

The patents identified above relate to various systems for mapping and navigation. In particular, the Gaer patent describes a system and method for ocean bottom mapping and surveying in which two ships travel on parallel courses, but some distance apart. Each ship transmits a fan shaped sonic pulse downward abut the vertical axis, and transverse to the ship's longitudinal axis. The backscattered echo is processed for depth. The forward scattered portion of this pulse is received by the other ship, and is analyzed to determine ocean bottom depths of the swath between the ships. Precise global navigation fixes and relative intership positional fixes are provided by the GPS.

The Counselman patent relates to a method and apparatus for determining a ship's position by using signals transmitted by GPS satellites. A precise measurement of the ship's range to each satellite is made based upon the L1 center frequency carrier phase. A correction for ionospheric effects is determined by simultaneous observation of the group delays of the wide bandwidth P code modulations in both the L1 and L2 bands. The group delays are determined by measuring the phases of carrier waves implicit in the spread-spectrum signals received in both bands. The unknown biases in the L1 center frequency carrier phase range measurements are determined from simultaneous, pseudorange measurements with time averaging. The instantaneous position of the ship may then be determined from the ranges so determined.

The Longaker patent describes a differential navigation system. A reference receiver of known location tracks a navigation information service, computes differential data with respect to that information, and communicates the data to a transmitting unit. The transmitting unit transmits differential data via a commercial geosynchronous earth satellite relay to a mobile user. The mobile user receives the relayed signal with a non-directional, circularly polarized, non-stabilized antenna.

The Redolfi patent relates to a high fidelity sound delivering system which can be mounted on a floating buoy to deliver sound both underwater and above. The system comprises a hollow sphere which is partially submerged and almost filled with water. A plurality of air-filled balls keep the sphere afloat. A dynamic sound transducer inside the sphere has its diaphragm bolted to the wall of the sphere. A second piezoelectric high frequency transducer is banded to the inside surface of the sphere. The mechanical vibration of the transducers are imparted to the walls of the sphere, which in turn generate sound waves directed both under and above the water.

The Westerfield patent describes a transdigitizer for relaying signals from GPS satellites. An RF stage, which comprises an antenna, filter and preamplifier receiver, filters and amplifies the signals. A converter stage, with bandpass filter, converts the GPS signal to a lower frequency. A final downconverter converts the signal to a base band frequency, and a zero crossing detector amplifies and quantizes the signal. A local oscillator controls a frequency synthesizer to latch the signal from the zero crossing detector in a flip flop, which in turn is used to control a quadraphase modulator. Signals from the modulator are then amplified and transmitted by an antenna. The transdigitizer thus transmits the translated GPS signal plus data gathered on board its host platform.

The, Taylor et al patent relates to a navigation system in which the NAVSTAR/GPS system constantly broadcasts a spread spectrum, pseudorandom code which is unique for each of the satellites in the GPS system. The nature of such a system allows for identification of the signal source. These signals are transmitted on a downlink to the user terminals. A transmitter accepts information from the GPS master control station, and in turn transmits an additional frequency shift keyed (FSK) signal on a reference channel to the terminals, which may then determine the position or velocity of the terminal. This transmitted signal contains GPS satellite position data as to which GPS satellites are in best view, Doppler prediction information, and a PRN code generator signal. It is this additional signal that allows for greater relaxation of local oscillator and signal processing requirements for the terminal receivers.

Although these patents relate to navigation systems which utilize the GPS system, they do not describe a system by which underwater users could dynamically determine their postion in a geodetically based coordinate system.

SUMMARY OF THE INVENTION

The present invention includes a means for underwater vehicles to dynamically determine their position in a geodetically based coordinate system using the Global Positioning System satellite network and a matrix of transducer navigation buoys. Free roving buoys which contain a sky pointing GPS (Global Positioning System) receiver and a sub-surface beacon transmitter, determine their positions as any other GPS user. Each buoy then formats and transmits its dynamic position data as a pseudo-satellite broadcast. A receiver on board the undersea vehicle subsequently determines its position by receiving broadcasts from multiple buoys as if it were any other GPS user receiving direct satellite broadcasts.

It is an object of the present invention to provide an underwater navigation system. It is another object of the invention to make use of the existing Global Positioning System and existing transducer buoy technology, and extend the use of these systems to underwater vehicle navigation.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 4 is an illustration of the current practice of locating underwater vehicles with the help of a support vehicle;

DETAILED DESCRIPTION OF THE PREFERRED EMBODIMENT

The present invention provides a means for underwater users to dynamically determine position in a geodetically-based coordinate system. Because of the service provided by the Global Positioning System, the subject invention also provides the user access to National Bureau of Standards-traceable time.

Figure 1:
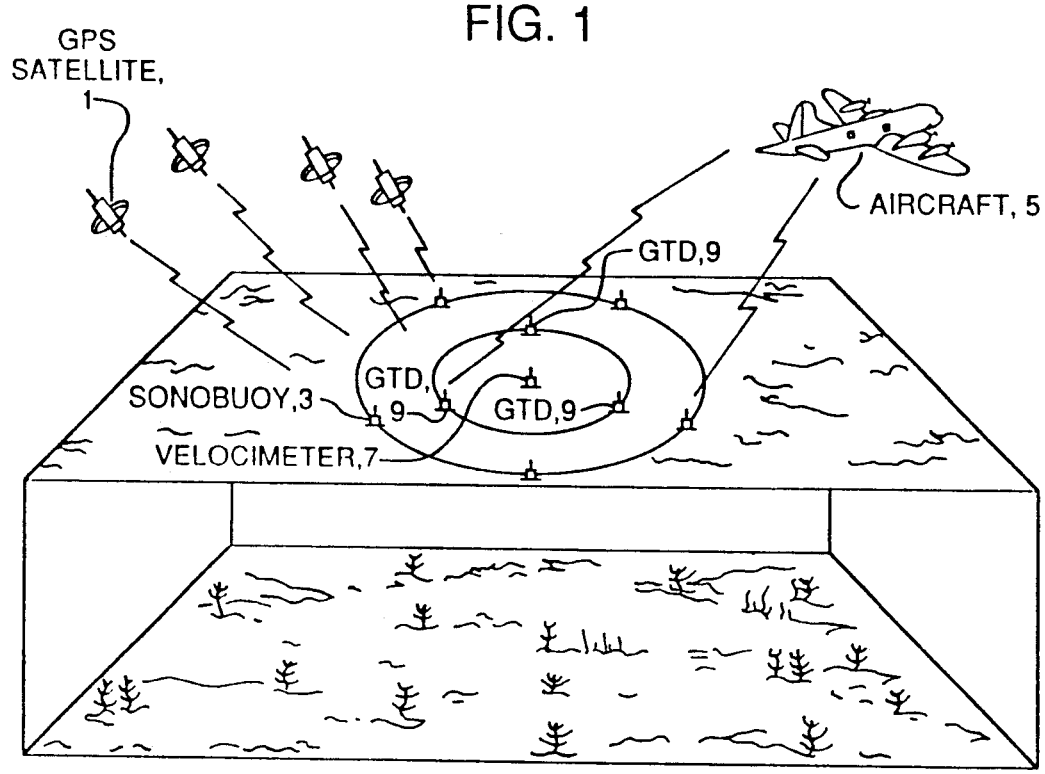
FIG. 1 is an illustration of the current use of the Global Positioning System with transducer buoys and sonobuoys.

In order to understand the use of sonobuoys with the GPS, the reader's attention is directed to FIG. 1.

FIG. 1. is a sketch of the current use of an array of sonobuoys in the testing of a ballistic missile system through use of a Sonobuoy Missile Impact Location System (SMILS) With this system, up to 15 sonobuoys 3 are dropped in an array in the target area. Each buoy uses the ability of detecting acoustic (in water) noise generated by the splash of the reentry body and of transmitting the reentry data to an aircraft 5 circling overhead.

Several different types of buoys are used in the system shown in FIG. 1. The velocimeter buoy 7 is used to measure the velocity of sound in water. A bathythermograph body may also be deployed to measure water temperature as a function of depth.

Three of the buoys in the array are known as GPS transdigitizer buoys (GTD)9. These buoys contain a relay that receives signals from GPS satellites 1 in view and translates them down to base band where they are one-bit quantized and sampled at a 2 megasample/sec rate. These data along with a data stream generated by digitizing the acoustic data are then used to modulate a carrier for transmission to the aircraft 5 that is circling overhead. The GTD buoy is also equipped with a command receiver for turning the transdigitizer power off and on and for commanding acoustic pings.

In addition to the three GTD buoys 9 and velocimeter buoy 7, additional buoys 3 are used in the array that are similar to the standard ASW (Anti-Submarine Warfare) buoy. These buoys 3 receive acoustic data, relay it to the supporting aircraft, and also generate acoustic pings. The availability of more than three buoys reduces the possibility of signals being missed because of a particular buoy receiving simultaneous signals from more than one reentry body splash.

Figure 2:
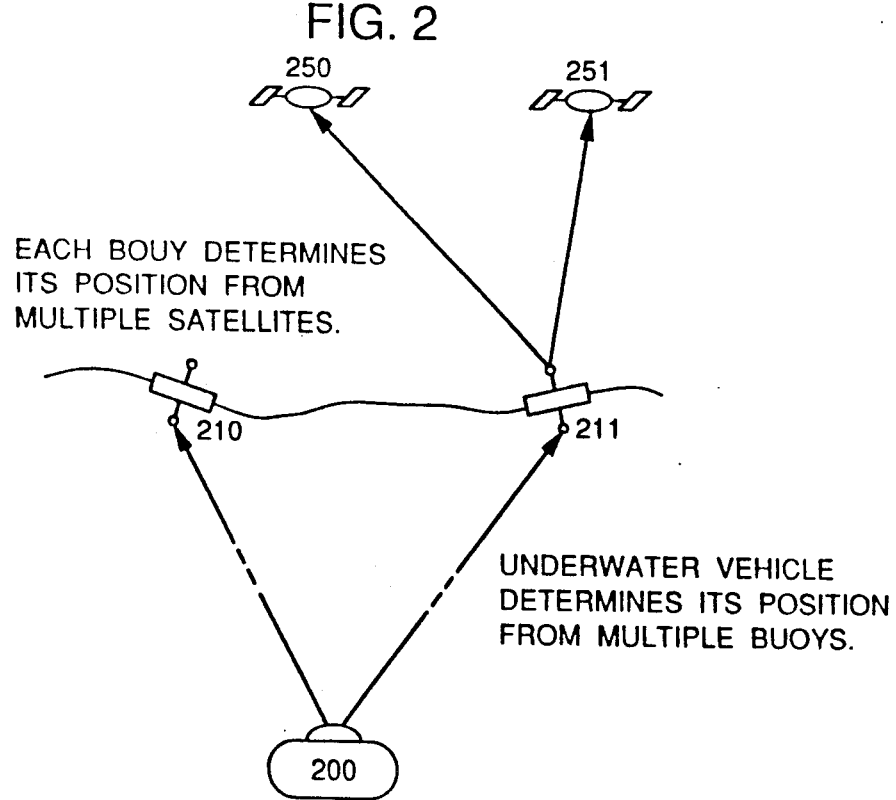
FIG. 2 is an illustration of the overview of the operation of the present invention.

The present invention enables undersea vehicles to determine their position using both the GPS navigation network of satellites, and a group of sonobuoys. This undersea navigation system is illustrated in FIG. 2, as discussed below.

The present invention includes an undersea navigation process composed of two steps. In step 1, each sonobuoy determines its postion from the multiple satellites 250 and 251 of the GPS system. In step 2, an underwater vehicle 200 determines its position from transmissions made by a matrix of sonobuoys. This is accomplished since the free-roving buoys each contain a sky-pointing GPS receiver and sub-surface beacon transmitter. Each buoy 210 and 211 determines its postion in the same fashion as any other GPS user, making coordinate system corrections for the lever arm effect of the GPS antenna location relative to the buoy's center of mass. After further correction for the lever arm effect of the beacon transducer location, this dynamic position data is formatted and transmitted as a pseudo-satellite broadcast. A receiver on board the undersea vehicle 200 subsequently determines its position by receiving broadcasts from multiple buoys as if it were any other GPS user receiving broadcasts from satellites 250 and 251.

The data message broadcast by the buoys is of different format and content than that of the satellites. In each of these cases, the location and motion of the broadcasting vehicle are known a priori and are stable (location is constant in the case of pseudo-satellites used on terrestrial ranges). An essential characteristic of this invention is that the buoy's data message contains dynamically varying position information, rather than ephemerides or a fixed position. The free-roving motion of the buoys and the dynamics of their flotation argue strongly for a data message containing position, velocity, acceleration, and time in implementations where accuracy is a paramount specification.

The preferred embodiment of this invention uses acoustic transmission of data from the buoy to the underwater user. Transducers on the buoys and sensors on the underwater user are nominally hemispherical in radiation pattern. Calculation of underwater user's postion is based on the demodulated content of the buoy's broadcast data. Spread-spectrum encoding is used to allow a single beacon carrier frequency for all buoys. One alternate embodiment substitutes laser transmission of data. In a second alternate embodiment, the underwater user augments data demodulation with phase tracking of the broadcast signal's carrier to increase the resolution of calculated position. A third alternate embodiment assigns separate and locally-unique beacon carrier frequencies to each buoy. A fourth alternate embodiment extends any other navigation service in the same fashion as is done with GPS in the preferred embodiment. All alternate embodiments can be accomplished collectively or separately.

The essential features of the invention are: a) the use of a free-roving beacon providing a dynamic navigation source signal, b) the tying of the underwater user dynamically to a fixed geodetically-based time-space coordinate system, c) the dynamic computation of his own underwater position by the user, as opposed to the finding of the user by someone else.

Figure 3:
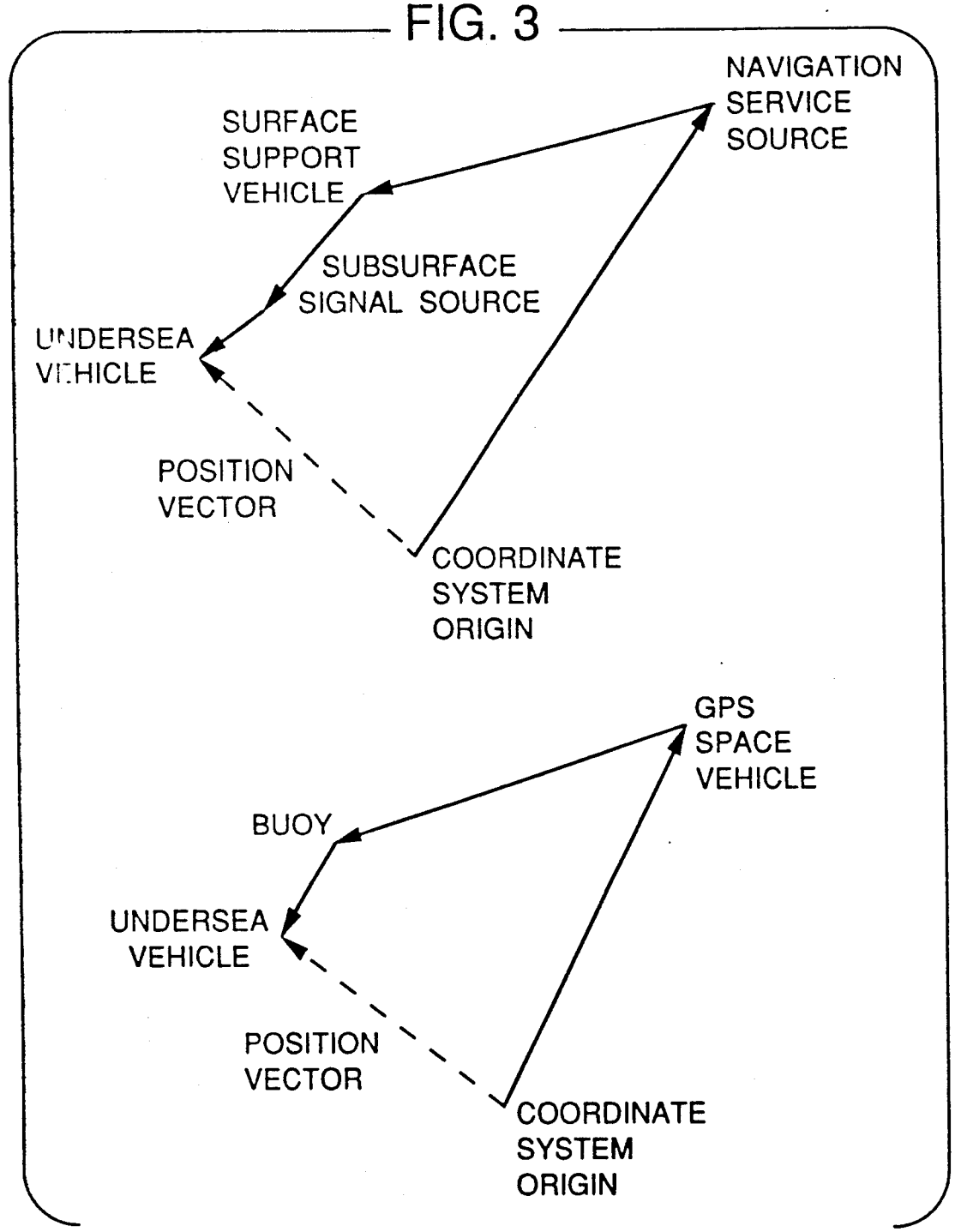
FIG. 3 are illustrations of the traceability of position measurement for an undersea vehicle both with and without the use of the present invention.

FIG. 3 shows a significant advantage provided by the invention. The traceability of position from the origin of the fixed geodetic system to the underwater user is a shorter chain of measurements than currently available with other systems.

Within the marine technology community (including, for example, those persons or groups conducting underwater research, defense, or commerce), underwater positioning and navigation are commonly done by: a) determining the position of a surface support vehicle, deploying bottom tethered beacons, relating their positions to that of the surface support vehicle and subsequently relating user position to their positions, b) determining the position of a surface support vehicle and subsequently relating the user's position to it, or c) relating data from one experiment to another based on the overlap of data and subsequently relating some element or elements of this data to known positions. These techniques are shown in FIG. 4.

To provide GPS service to an underwater user requires delivering derived data through a medium that does not support radio frequency transmission. The object is to provide a platform that will translate received signals. If this translation is done strictly as an up- or down-conversion of frequency, the result will parallel that done in range applications—the undersea user will merely have acquired an antenna on a remote platform and the ability to determine the platform's position, not his own. The platform must act as a translator of the GPS time and position service itself.

As mentioned above, the preferred embodiment of this system uses acoustic transmission of data from the buoy directly to the underwater user. Spread-spectrum encoding is used to allow a single beacon carrier frequency for all buoys. Calculation of the underwater user's position is based on the demodulated content of the buoy's broadcast data. This data can include both a transmission of the sonobuoy's location and the time according to the NBS time standard. When an undersea vehicle receives a transmission, two observations are immediately available: First the recipient knows the location of the transmitting sonobuoy. Second, the recipient can compare the reception time of the transmission with the time the message was sent. The duration of time lapse multiplied by the velocity of sound in water gives the range distance between the recipient and the sonobuoy. When multiple ranges between the recipient vehicle and multiple sonobuoys are triangulated, the location of the vehicle becomes known.

The actual position of each buoy is unimportant. Buoys are not emplaced to relay data of any permanent value (as would receivers dedicated to measuring crustal dynamics). Their role is to provide a dynamic link between the SV constellation and the underwater user.

Currents typically occur in the range of 0-20 knots. In some instances loose mooring may be practical, however in the more general case retrieval and drift out of the mission area must be considered. In a commercial implementation, each buoy would include a radio frequency homing beacon or position transponder to allow its retrieval. Additionally, the buoy's control system could be configured to silence its underwater transmitter at a predetermined time or distance from the prime mission area.

With the recent introduction of small, lightweight GPS receivers such as those made by Magellan, Magnavox and Texas Instruments, size is not a major consideration in the implementation of a buoy. The receiver, an added processing and control subsystem, the acoustic transmitter, battery power, and the homing beacon could easily be built within the envelope of an "A" size (123 millimeter diameter by 910 millimeter long, 5–15 kilogram) sonobuoy. Indeed, the design driver for packaging would be in achieving a geometry which minimized nutation, vertical bobbing and wind-induced drift.

The user's receiver is conceptually little different from current architectures and technological implementations. Signal acquisition, of course, would be done with an acoustic front end in lieu of the current L-band RF modules. Processing would have to accommodate an altered message. Features, navigation solution outputs, and data interfaces may be tailored to the user market.

Just as a terrestrial user does, an underwater user of extended GPS determines pseudorange by comparing an internally generated code stream to a received stream and relating the delay required for synchronization to transmission-medium delay. The terrestrial user models ionospheric delay; the underwater user must model acoustic delay in a compressible medium.

A terrestrial user gathers data from four SVs and essentially solves a "four equations in four unknowns" problem to determine its latitude, longitude, altitude, and time. In cases where signals from only three SVs are available, the terrestrial user can provide an assumed or estimated altitude as a constant in the equations and solve a "three equations in three unknowns" problem. The underwater user solves for its position and time in similar fashion, using data from four bouys. Since the underwater user has internally-collected data on pressure (hence a depth estimate), a "three equations in three unknowns solution" is also possible.

Acoustic velocity of propagation is a function of the density and elasticity of the medium. Density is defined simply as mass per unit volume. Elasticity is defined as the ratio of some given change in pressure to the accompanying fractional change in volume. It is known as volume elasticity or bulk modulus. (The reciprocal of elasticity is the more intuitive term, compressibility.) The density of water varies with depth, while both density and elasticity vary with temperature. In addition, both density and elasticity vary with the salinity of the water. Curves have been fit to available data and, depending on the experimental basis of the model used, may even include a latitude dependence.

Figure 5:
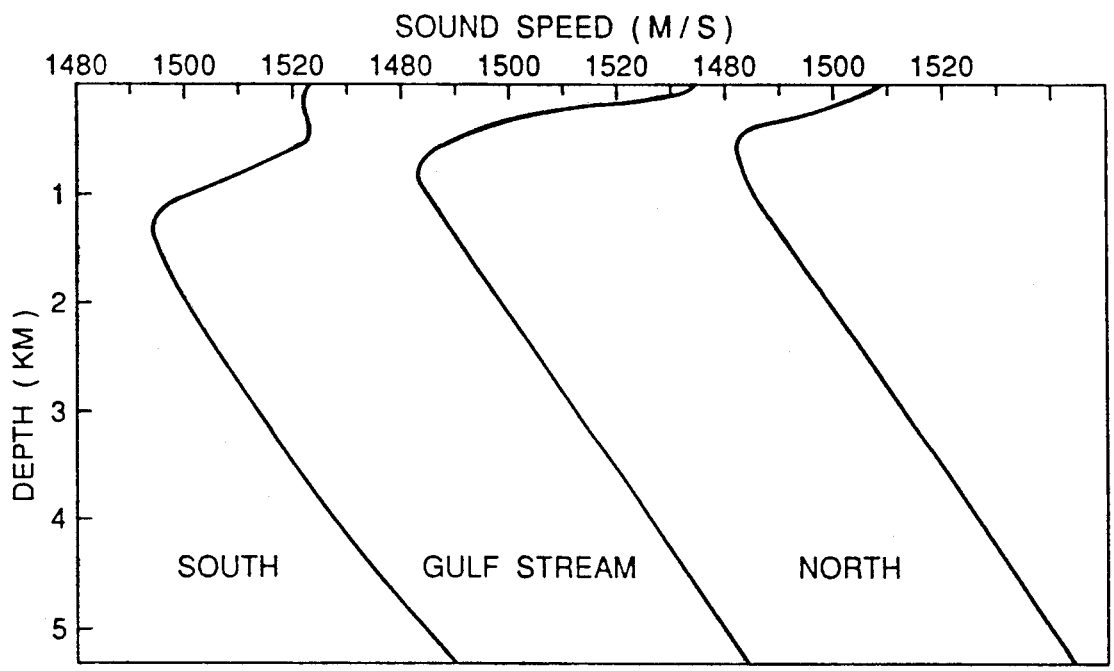
FIGS. 5 and 6 are charts depicting the velocity of sound in water with variations of depth.

The vertical gradient in propagation velocity means that travel time from transmitter to receiver is not directly proportional to the geometric slant range. Echo location systems use the average sound velocity in the water column and the measured round-trip travel time to generate a first approximation of slant range. They then solve for the actual slant range using a piecewise-linear approximation to the sound velocity profile as shown in FIG. 5. In the extended GPS, only one-way travel time is available.

Figure 6:
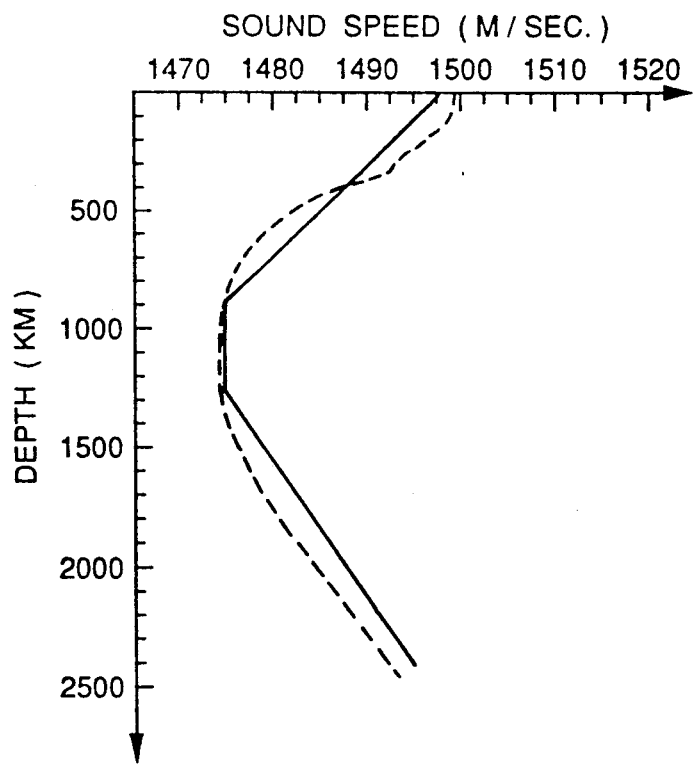

The profiles of sound speed in and around the Gulf Stream, shown in FIG. 6, provide an excellent illustration of the effect of medium parameters. These profiles also indicate that, given real-time data accumulated by both the GPS buoys and the underwater users, each user can maintain a satisfactorily-accurate local propagation delay model and use it to compute position.

By using pressure in lieu of depth, both buoy and user accommodate for the effects of pressure altitude at the surface. This eliminates one common mode error source. Since measured salinity is also an input parameter, using measured pressure makes the delay model amenable to use in elevated, non-oceanic bodies of water such as inland lakes. The speed of sound is approximately 1500 meters per second in sea water, but FIGS. 5 and 6 provide more accurate representations which account for variations with changes in water depth and temperature.

The GPS space vehicle's (SV) message consists of a 1500-bit frame. The frame is divided into five subframes of 300 bits each. Each subframe consists of ten 30-bit words. Words one and two of all subframes are the telemetry and handover words, respectively.

Subframe one contains clock parameters, SV accuracy and health, and parameters for computing propagation delay. Subframes two and three contain the ephemeris representation of the transmitting space vehicle. Subframes four and five contain almanac data for all SVs. Subframe four also supports special messages, ionospheric and time data, and configuration and anti-spoof status on each SV. Data in subframes four and five is commutated, necessitating the entire message to be sent 25 times before a complete almanac has been passed.

When the Global Positioning System was being tested, an "inverted range" was built at the U.S. Army's Yuma Proving Ground, AZ. The use of ground-based pseudo-satellites permitted tests of user equipment at times other than those limited by the visibility of SVs in a partial constellation. The use of ephemeris data in subframe one of the navigation message would have been inappropriate for stationary earthbound transmitters, and other portions of the message were not applicable. Consequently, the fixed coordinates of the ground transmitters were inserted in place of the ephemeris data and the data fields of subframes two through five were loaded with alternating ones and zeros. The result was a message little different in format or transmission rate than that of an SV, even though significantly less useful information was being sent.

The data message broadcast by the buoys must be of different format and content than that of the satellites or fixed terrestrial pseudo-satellites. In each of these former cases, the ephemerides and motion of the broadcasting vehicle are know a-priori and are stable. (Location is constant in the case of pseudo-satellites). In the case of buoys, the detail of motion is neither predictable nor amenable to buoy-to-buoy almanacing. Furthermore, having a shorter message by omitting almanac data increases the useful data rate in a medium where propagation speeds are measured in hundreds, rather than hundreds of millions of meters per second.

An essential requirement brought about by the use of buoys is that the data message now must contain dynamically varying position information, rather than ephemerides or a fixed position. The free-roving motion of the buoys and the dynamics of their flotation argue strongly for a data message containing position, velocity, and acceleration.

The propagation velocity of sound in water is a function of salinity, temperature, and pressure. Since these parameters are different at the buoy than at the user, they are added to the data stream to permit modelling of the medium by using data from both end-points of the path.

A Z-count and handover word remain relevant and necessary for clock synchronization and are therefore reprocessed and sent in the buoy message. The telemetry word and various flags, such as the momentum dump flag, are irrelevant to the buoy message because the buoy is the end-user of the direct GPS signal. All SV health and accuracy recognition, clock correction, etc. are done by the buoy's receiver from data in the SV message. The buoy computes its position and time to terrestrial user equipment accuracy. It then needs to pass only that data necessary for the underwater user to calculate position and time from the "givens" that the buoy has.

Although there is no buoy local error issue for underwater user, the buoy must pass certain new or derived information to enable the underwater user to establish a local error estimate. Computed user range error (URE) is transmitted and used by the underwater receiver much as the SV accuracy data is used by the terrestrial receiver. This, combined with a buoy health flag and information regarding the type and status of terrestrial service available, enables the underwater receiver to compute its extended range error—(ERE) the analog to the terrestrial URE.

Figure 7:
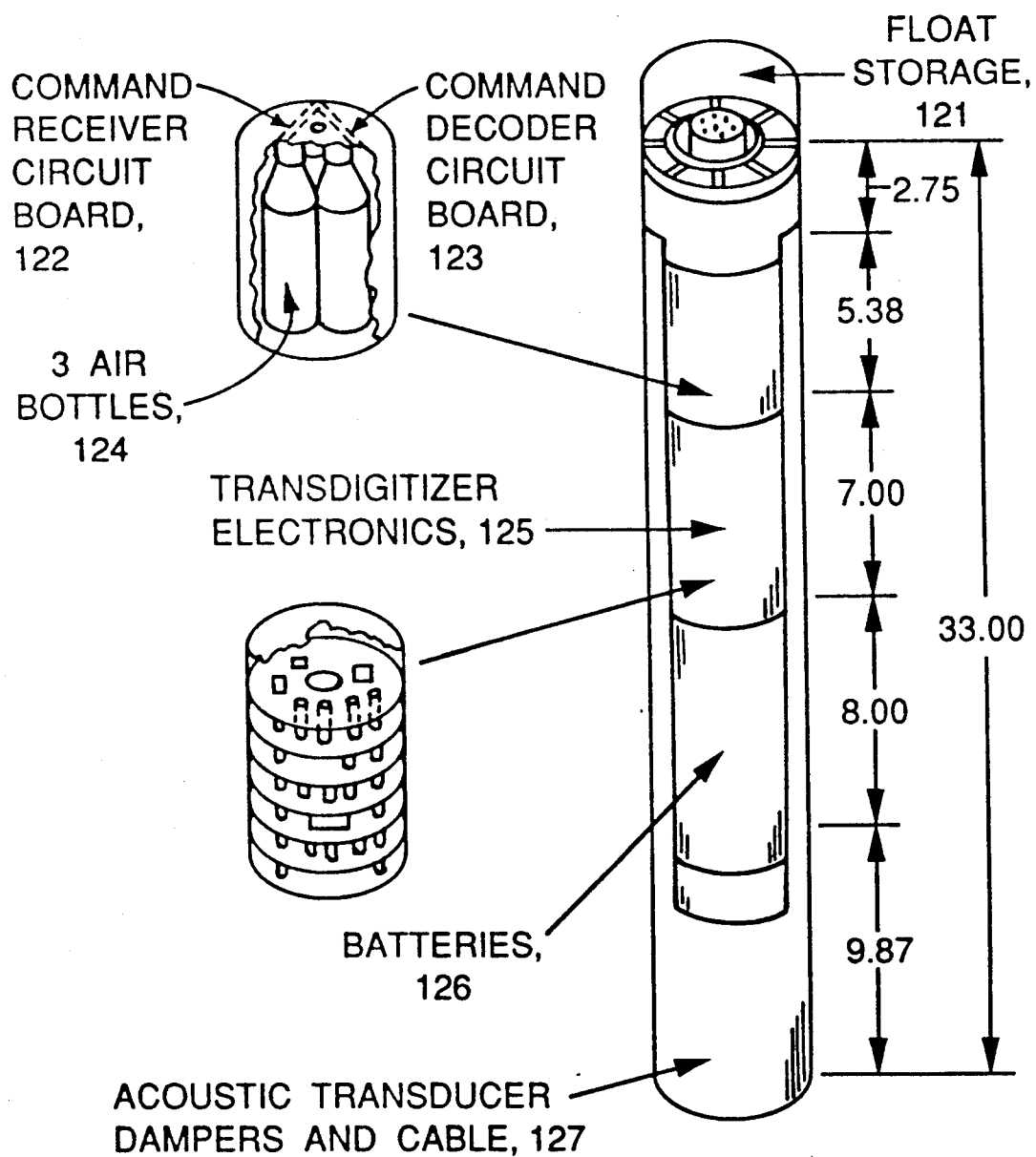
FIG. 7 is an illustration of a prior art transducer sonobuoy which may be altered for use with the GPS to provide undersea navigation in accordance with the principles of the present invention.

FIG. 7 is an illustration of a prior art buoy transducer system which may be altered for use in the present invention. The command receive circuit 122 in the buoy will receive the navigation signal from the GPS satellites as illustrated in FIG. 2. The acoustic transducer 127 at the bottom of the buoy transmits the acoustic data message of Table 1 which allows the undersea vehicle of FIG. 2 to determine its location as described above.

TABLE 1

| Word 1: | HOW & Z-Count |
| --- | --- |
| Word 2: | Buoy nav data |
|  | Position |
|  | Velocity |
|  | Acceleration |
| Word 3: | Acoustic model parameters |
|  | Surface temperature |
|  | Surface pressure |
|  | Surface salinity |
| Word 4: | Buoy validity data |
|  | Buoy health |
|  | SVs in view |
|  | URE flags |
|  | source: PPS/SPS |
|  | SA/AS status |

The command decoder circuit board 123 is a microprocessor which will control the functioning of the buoy's subsystems. The transdigitizer electronics 125 will formulate output signals to contain data that contains the transducer buoy's latitude, longitude, and altitude (as calculated from the radio frequency navigation signals received from the GPS satellites via the command receive circuit 122); a measure of the water's surface temperature, pressure, and salinity measured by buoy's sensors; and the buoy's velocity and acceleration. These data will be synchronized to the time service provided by the GPS satellites. This data synchrony when referenced to the actual content of the transmitted data, will serve as an indication of the time that the acoustic transducer actually transmits its acoustic data message signals. When the transmittal time is compared with a time of message receipt by the undersea vehicle, the time lapse may be multiplied by the velocity of sound in water to produce an estimate of the range distance between the undersea vehicle and the transucer buoy.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a Global Positioning System network of navigation satellites which emit worldwide radio frequency navigation signals, an underwater navigation process comprising the steps of:

using a plurality of transducer buoys so that each of them receives said worldwide radio frequency navigation signals from said Global Positioning System network of satellites to determine their position and emit acoustic underwater data messages which contains this position; and having an underwater vehicle receive said acoustic underwater data messages from said plurality of transducer buoys so that they can determine their underwater position therefrom.

2. A process, as defined in claim 1, wherein said using step entails using at least three transducer buoys so that said underwater vehicle can triangulate its underwater position by determining its location with respect to the three transducer buoys.

3. A process, as defined in claim 1, wherein each of said plurality of transducer buoys includes a time of transmittal in its acoustic underwater data message so that the time of transmittal may be compared with a time of receipt by the underwater vehicle and an estimate range between the underwater vehicle and the transducer buoy determined therefrom.

4. A process, as defined in claim 2, wherein each of said plurality of transducer buoys includes a time of transmittal in its acoustic underwater data message so that the time of transmittal may be compared with a time of receipt by the underwater vehicle and an estimate range between the underwater vehicle and the transducer buoy determined therefrom.

5. A process, as defined in claim 3, wherein said having step includes a calculation of range between the transducer buoy and the underwater vehicle which is performed by multiplying a difference value by the velocity of sound in water to yield the range, said difference value being a value of seconds which represent a difference between the time of receipt of the underwater data message, and the time of transmittal.

6. A process, as defined in claim 4, wherein said having step includes a calculation of range between the transducer buoy and the underwater vehicle which is performed by multiplying a difference value by the velocity of sound in water to yield the range, said difference value being a value of seconds which represent a difference between the time of receipt of the underwater data message, and the time of transmittal.

7. A process, as defined in claim 5, wherein said acoustic underwater data messages each comprise an acoustic modulated signal in which the following information is included: buoy latitude, longitude, and altitude, buoy velocity, buoy acceleration, water surface temperature, water surface pressure, and water surface salinity.

8. A process, as defined in claim 6, wherein said acoustic underwater data messages each comprise an acoustic modulated signal in which the following information is included: buoy latitude, longitude, and altitude, buoy velocity, buoy acceleration, water surface temperature, water surface pressure, and water surface salinity.

9. An underwater navigation system which allows an underwater vehicle to receive a plurality of acoustic underwater data messages from a plurality of point sources such that each of the acoustic underwater data messages contains information that identifies the point source's origin in latitude, longitude, and altitude, said underwater navigation system comprising:
- a network of Global Positioning System satellites which emit radio frequency navigation signals;
- a plurality of transducer buoys which each receive said worldwide radio frequency navigation signals from said Global Positioning System network of satellites to determine their position and emit said acoustic underwater data messages which contains this position; and
- an underwater receiver system which is fixed within said underwater vehicle and which receives and uses said acoustic underwater data to determine said underwater vehicle's location therefrom.

10. An underwater navigation system, as defined in claim 9, wherein each of said plurality of transducer buoys comprise:
- a floating frame;
- a receiver housed in said floating frame, said receiver receiving and conducting said radio frequency navigation signals from said network of Global Positioning Satellites;
- a command network which receives said radio frequency navigation signals therefrom and which produces output signals by calculating the transducer buoy's latitude and longitude and altitude; and
- an acoustic transducer which outputs said acoustic underwater data messages by processing the output signals of the command network.

11. An underwater navigation system, as defined in claim 10, wherein said command network includes in its output signals a time signal based on a National Bureau of Standards traceable time, said time signal serving as an indicator of transmission time at which the acoustic underwater data messages are transmitted from the acoustic transducer, said transmission time being a value which may be compared with a time of receipt of the acoustic underwater data messages by the underwater vehicle so that an estimate of range between the underwater vehicle and the transducer buoy may be determined.

12. An underwater navigation system, as defined in claim 10, wherein said command network is a microprocessor which formulates its output signals to contain data that includes the transducer buoy's latitude, longitude, and altitude a measure of surface temperature of water next to the transducer buoy, a measure of surface pressure and salinity, and an estimate of the transducer buoy's velocity and acceleration.

13. An underwater navigation system, as defined in claim 11, wherein said command network is a microprocessor which formulates its output signals to contain data that includes the transducer buoy's latitude, longitude, and altitude, a measure of surface temperature of water next to the transducer buoy, a measure of surface pressure and salinity, and an estimate of the transducer buoy's velocity and acceleration.

14. An underwater navigation system, as defined in claim 9, wherein said plurality of transducer buoys includes at least three transducer buoys whose acoustic underwater data messages provide the underwater vehicle with at least three point source origins in latitude, longitude, and altitude, and at least three range value estimates that intersect at the underwater vehicle's location.

15. An underwater navigation system, as defined in claim 10, wherein said plurality of transducer buoys includes at least three transducer buoys whose acoustic underwater data messages provide the underwater vehicle with at least three point source origins in latitude, longitude, and altitude, and at least three range value estimates that intersect at the underwater vehicle's location.

16. An underwater navigation system, as defined in claim 11, wherein said plurality of transducer buoys includes at least three transducer buoys whose acoustic underwater data messages provide the underwater vehicle with at least three point source origins in latitude, longitude and altitude, and at least three range value estimates that intersect at the underwater vehicle's location.

17. An underwater navigation system, as defined in claim 12, wherein said plurality of transducer buoys includes at least three transducer buoys whose acoustic underwater data messages provide the underwater vehicle with at least three point source origins in latitude, longitude and altitude, and at least three range value estimates that intersect at the underwater vehicle's location.

18. An underwater navigation system, as defined in claim 13, wherein said plurality of transducer buoys includes at least three transducer buoys whose acoustic underwater data messages provide the underwater vehicle with at least three point source origins in latitude longitude, and altitude, and at least three range value estimates that intersect at the underwater vehicle s location.

19. A process, as defined in claim 5, wherein said velocity of sound in water is determined using information measured separately at each transmiting location and at each receiving location, said information including: water temperature, water pressure, and water salinity.

20. A process, as defined in claim 6, wherein said velocity of sound in water is determined using information measured separately at each transmitting location and at each receiving location, said information including: water temperature, water pressure, and water salinity.

21. An underwater navigation system, as defined in claim 9, wherein said receiver system comprises:
- a submerged frame;
- a submerged frame,
- a receiver housed in said submerged frame, said receiver receiving and conducting said acoustic underwater data messages from said plurality of transducer buoys;
- sensors which measure physical and chemical parameters of the water surrounding the frame; and
- a command network which receives said data messages and measured parameters therefrom and which produces output data by calculating said receiver system's location in latitude, longitude, altitude, and time.

22. An underwater navigation system, as defined in claim 21, wherein said calculating performed by said command network determines the velocity of sound in water using information measured separately at each transmitting location and at said receiving location, said information including: water temperature, water pressure, and water salinity.

* * * * *